(12) United States Patent
Matsuoka

(10) Patent No.: US 8,634,642 B2
(45) Date of Patent: Jan. 21, 2014

(54) IMAGE PROCESSING APPARATUS, IMAGE PROCESSING METHOD AND PROGRAM

(71) Applicant: Canon Kabushiki Kaisha, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/928,247

(22) Filed: Jun. 26, 2013

(65) Prior Publication Data

US 2013/0287297 A1 Oct. 31, 2013

Related U.S. Application Data

(63) Continuation of application No. 13/315,160, filed on Dec. 8, 2011.

(30) Foreign Application Priority Data

Dec. 15, 2010 (JP) ................. 2010-279543
Dec. 15, 2010 (JP) ................. 2010-279544

(51) Int. Cl.
*G06K 9/00* (2006.01)

(52) U.S. Cl.
USPC .......................................... 382/167

(58) Field of Classification Search
USPC ......................... 382/162, 167, 275; 358/518
See application file for complete search history.

(56) References Cited

U.S. PATENT DOCUMENTS 8,311,280 B2 * 11/2012 Miyazaki ..................... 382/103

* cited by examiner

*Primary Examiner* — Duy M Dang
(74) *Attorney, Agent, or Firm* — Canon U.S.A., Inc. IP Division

(57) ABSTRACT

An image processing apparatus capable of performing chromatic aberration of magnification and noise reduction without decrease in processing performance and increase in the cost is provided. A format conversion circuit in the image processing apparatus converts first image data including an array of color components of red (R), green (G1 and G2), and blue (B) into second image data including the color components of R and B and a luminance component by performing false color suppression processing on the first image data separately using the color components of G1 and G2, and stores the data in an image buffer region. A circuit for correcting chromatic aberration of magnification reads the second data stored in the image buffer region and performs the correction of chromatic aberration of magnification.

5 Claims, 8 Drawing Sheets

IMAGE PROCESSING APPARATUS, IMAGE PROCESSING METHOD AND PROGRAM

CROSS-REFERENCE TO RELATED APPLICATION

This application is a Continuation of U.S. application Ser. No. 13/315,160 filed Dec. 8, 2011, which claims priority from Japanese Patent Applications No. 2010-279543 filed Dec. 15, 2010 and No. 2010-279544 filed Dec. 15, 2010, which are hereby incorporated by reference herein in their entirety.

BACKGROUND OF THE INVENTION

1. Field of the Invention

Embodiments of the present invention relate to a technique for correcting chromatic aberration of magnification on image data.

2. Description of the Related Art

Conventionally, techniques for correcting chromatic aberration of magnification caused by an imaging optical system have been known. In the technique discussed in Japanese Patent Application Laid-Open No. 2008-015946, in order to correct chromatic aberration of magnification, first, a video signal captured by an image sensor including a color filter of a Bayer array is separated into red (R) components, green (G) components, and blue (B) components. Then, a pixel value of a pixel that does not contain the R component is interpolated by adjacent pixels of the R components, so that an interpolation R component is generated. A pixel value of a pixel that does not contain the B component is interpolated by adjacent pixels of the B components, so that an interpolation B component is generated.

After the processing, a circuit for correcting chromatic aberration of magnification performs correcting chromatic aberration of magnification by replacing each pixel value of the interpolation R components with a pixel value expected to be there when the G components are used as a reference. Further, if the position of the pixel to be replaced with the pixel value expected to be there is deviated by less than one pixel from the pixel values of the peripheral R components, by interpolating the deviation of less than one pixel from the pixel values of the peripheral R components, the pixel value to be replaced is calculated. On the interpolation of B components, similar replacement is performed. Further, the pixel positions of the interpolation R components and the interpolation B components are corrected with respect to the G components, so that the chromatic aberration of magnification is corrected.

The R components, B components, and G components whose chromatic aberrations of magnification are corrected are then subjected to image quality adjustment processing, such as gamma correction and aperture correction, and the components are converted into luminance components and color difference components. When the color difference components are generated, false color suppression processing is performed such that aliasing around the Nyquist frequency does not appear as a false signal in the image.

Meanwhile, a technique for reducing noise by dividing an image signal into a plurality of frequency bands and performing frequency synthesis on the image signals processed in each frequency band has been known. For example, in the technique discussed in Japanese Patent Application Laid-Open No. 2008-015741, while preserving edge components in each of n frequency bands, noise components are reduced, so that only the noise components may be reduced while the wide band edge components are being preserved.

By applying the above-described techniques, it is assumed that the image quality adjustment processing, such as the gamma correction and the aperture correction, is performed by performing the correction of chromatic aberration of magnification, and then the luminance components and the color difference components are output by performing the noise reduction processing while performing the false suppression processing.

However, in such a technique on the above-described assumption, the band-limited image signals need to be stored in many planes in a memory including a dynamic random access memory (DRAM), or the like. Further, the image signals of each plane need to be stored for each frequency component. Therefore, in a case of processing requiring high-speed performance, such as continuous shooting, if a memory access amount per unit time increases and reaches an upper limit of the memory access band, the processing performance decreases. Further, the increase in the necessary memory capacity will cause increase in the cost of the image processing apparatus.

SUMMARY OF THE INVENTION

One disclosed aspect of the embodiments is directed to an image processing apparatus capable of performing correction of chromatic aberration of magnification and noise reduction without causing deterioration of processing performance and increase in the cost.

According to an aspect of the embodiments, an image processing apparatus including a first conversion unit configured to convert first image data including an array of color components of red (R), green (G1 and G2), and blue (B) into second image data including the color components of R and B and a luminance component by performing false color suppression processing on the first image data separately using the color components of G1 and G2, a first storage unit configured to store the second image data in a storage medium, and a correction unit configured to read the second image data stored in the storage medium and perform correction of chromatic aberration of magnification on the color components of R and B in the second image data.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the embodiments will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
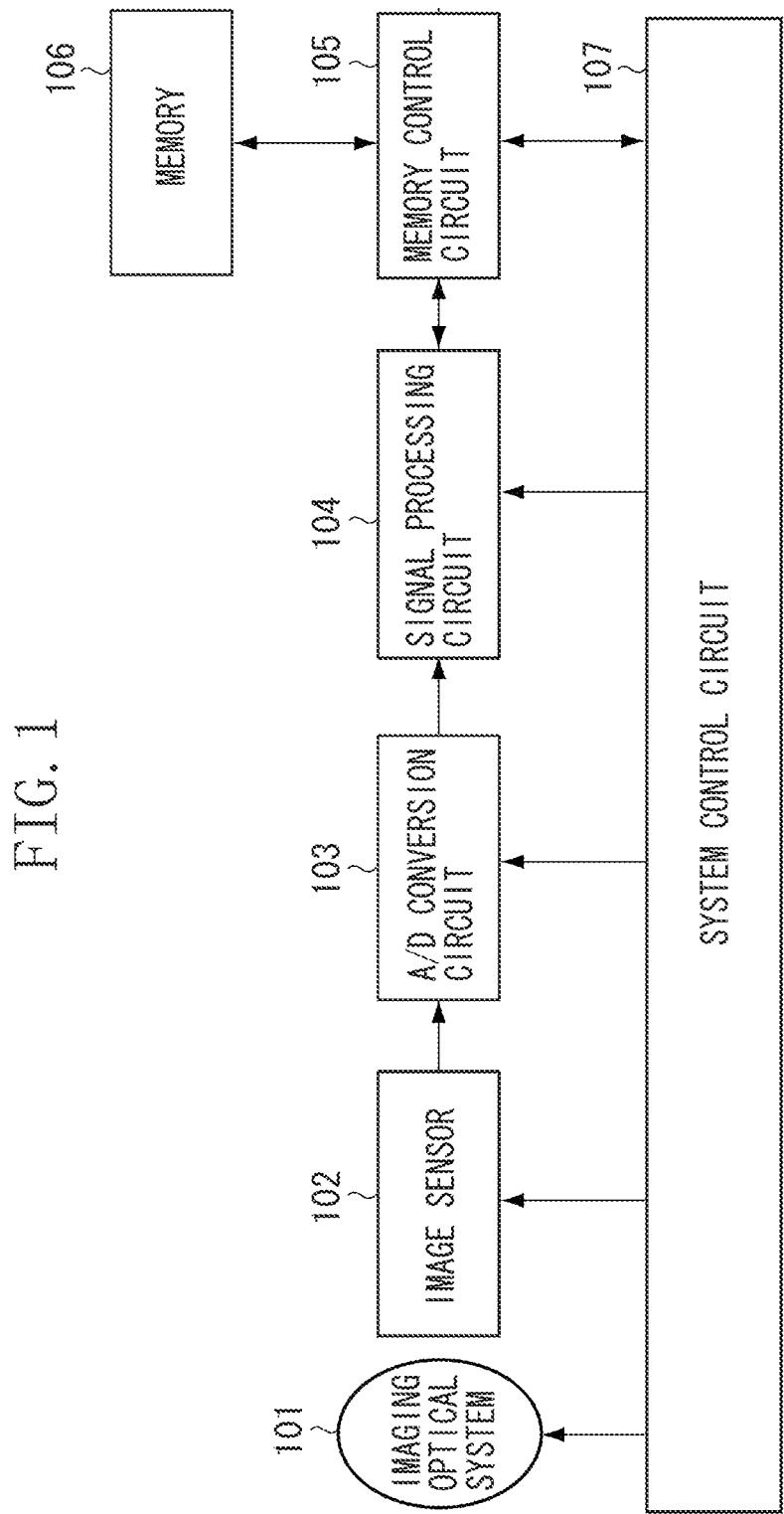
FIG. 1 illustrates a configuration of an image processing apparatus according to an exemplary embodiment.

A first exemplary embodiment is described. FIG. 1 illustrates a configuration of an image processing apparatus according to the first exemplary embodiment. In FIG. 1, an imaging optical system 101 which includes a lens, a diaphragm, and the like, performs focus adjustment and exposure adjustment. An image sensor 102 includes a charge coupled device (CCD) sensor or a complementary metal-oxide semiconductor (CMOS) sensor. The image sensor 102 converts an optical image transmitted through the imaging optical system 101 into an electronic signal. An analog-to-digital (A/D) conversion circuit 103 converts an analog image signal output from the image sensor 102 into a digital image signal.

A signal processing circuit 104 performs processing, such as aberration correction of the imaging optical system, noise reduction, or the like, to image data (digital image signal) output from the A/D conversion circuit 103. A memory control circuit 105 writes and reads the image data to/from a memory (DRAM) 106. A system control circuit 107 controls an entire operation of the image processing apparatus.

Figure 2:
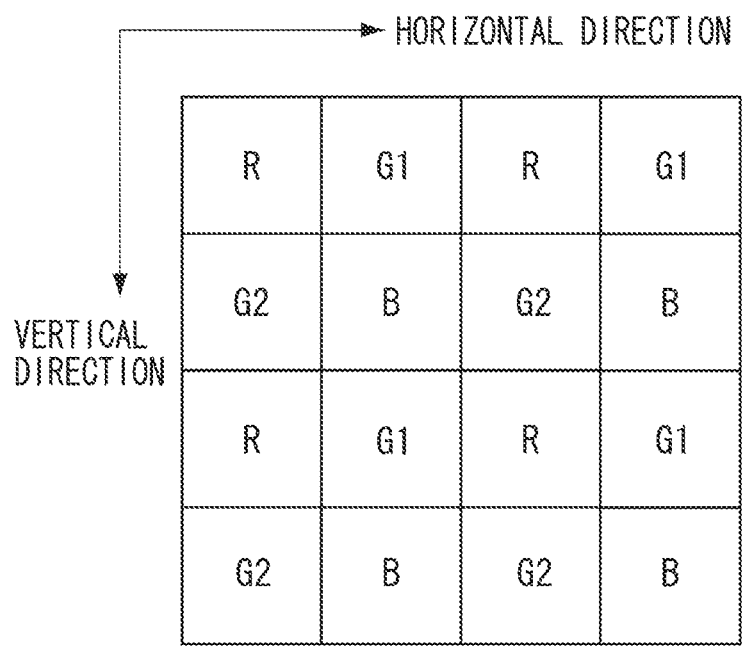
FIG. 2 illustrates a configuration of a color filter of a Bayer array.

On an image forming plane of the image sensor 102, a color filter of a Bayer array as illustrated in FIG. 2 is arranged for each pixel. Each of the pixels outputs a pixel value corresponding to the color of the color filter. In FIG. 2, a G filter located in the horizontal direction of an R filter and in the vertical direction of a B filter is defined as a G1 filter, and a G filter located in the vertical direction of the R filter and in the horizontal direction of the B filter is defined as a G2 filter.

Figure 3:
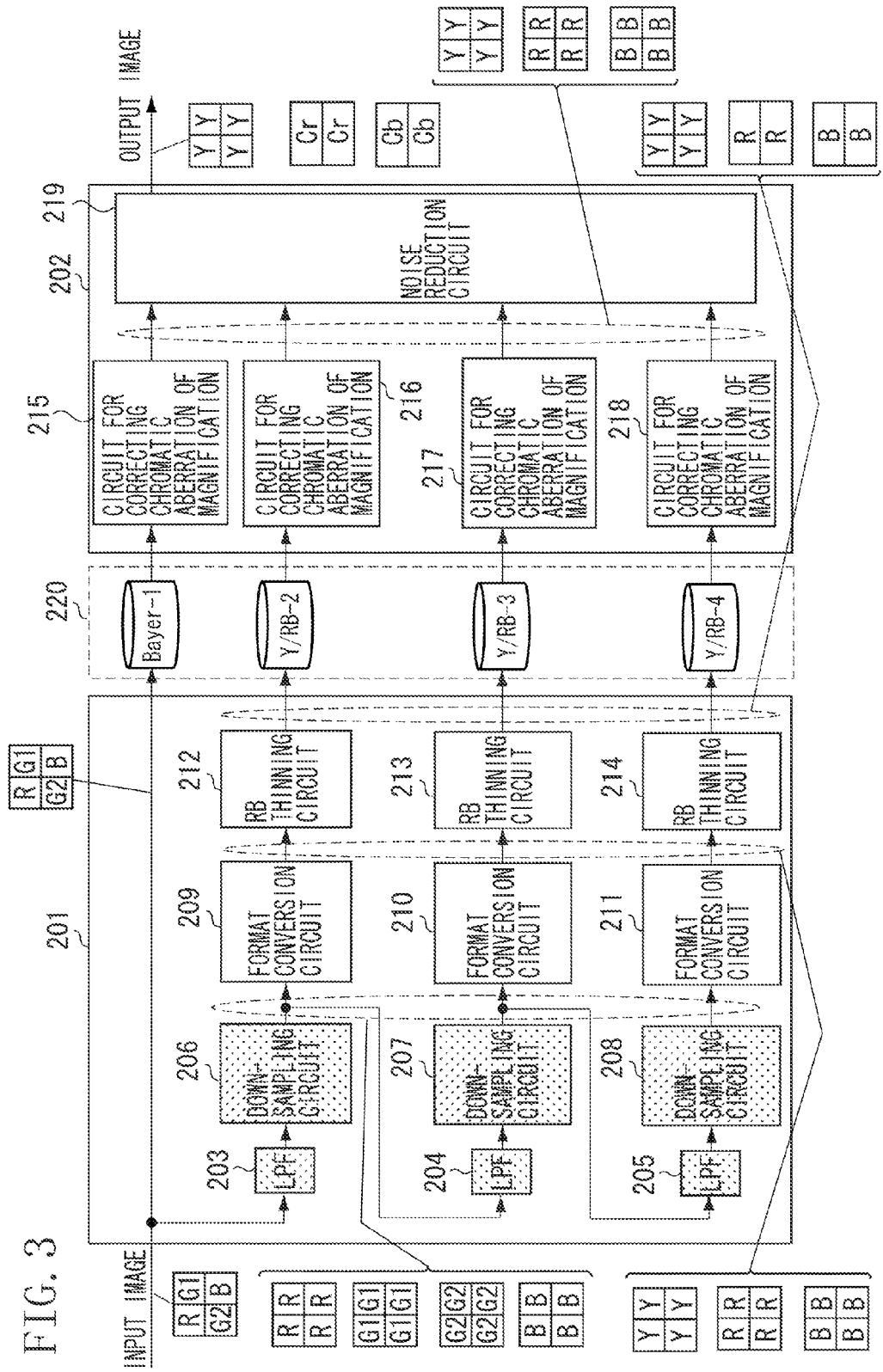
FIG. 3 illustrates a detailed configuration of a signal processing circuit according to a first exemplary embodiment.

FIG. 3 illustrates a detailed configuration of the signal processing circuit 104 according to the first exemplary embodiment. In FIG. 3, the signal processing circuit 104 includes a frequency decomposition circuit 201, a frequency synthesis circuit 202, and an image buffer region 220. Image data output from the frequency decomposition circuit 201 is stored in the image buffer region 220. The frequency synthesis circuit 202 reads the image data from the image buffer region 220, and perform processing. The image data output from the frequency synthesis circuit 202 is stored in the memory 106.

The frequency decomposition circuit 201 receives A/D-converted image data (first image data) as input. The image buffer region 220 serves as a buffer region to be used by the signal processing circuit 104. A region secured in the memory 106 in FIG. 1 may be used as the image buffer region 220. Low-pass filter circuits (LPFs) 203 to 205 remove high-frequency components in the input image data. Down-sampling circuits 206 to 208 reduce the image data output from the respective low-pass filter circuits 203 to 205.

Format conversion circuits 209 to 211 convert image data of R/G1/G2/B (i.e., R component, G1 component, G2 component, and B component) into image data (second image data) of Y/R/B (i.e., Y component, R component, and B component). Further, the format conversion circuits 209 to 211 perform false color suppression processing.

The false color suppression processing may be implemented, for example, by the following method. According to correlation of a spatial direction of an optical image formed on the image sensor 102, a component having higher correlation is selected and defined as a (R-Ga1) component from among (R-G1) components or (R-G2) components in each pixel. Further, the G1 component and the G2 component are defined as the same G components. In each pixel, a Gb component is generated by interpolating the G components, and a (R-Gb) component is generated. Further, according to color saturation, the (R-Ga1) component or the (R-Gb) component is selected in each pixel and defined as a Cr component. A Cb component is similarly generated.

By the above processing, the Cr component and the Cb component that are color difference signals in which the false colors are suppressed are generated in each pixel. The Cr component and the Cb component may be values obtained by performing weighted addition to the (R-Ga1) component and the (R-Gb) component, or the value of the (R-Ga1) component may be directly used. A Y component that is a luminance signal is generated, for example, by the following calculation using the R component, the G component, and the B component interpolated according to the correlation in the special direction of the optical image formed on the image sensor 102.

$$Y = 0.30R + 0.59G + 0.11B$$

The format conversion circuits 209 to 211 generate Y as the Y component, (Cr+Y) as the R component, and (Cb+Y) as the B component based on the Y component as the luminance signal, and the Cr component and the Cb component that are the color difference signals, and output image data of Y/R/B.

Figure 4:
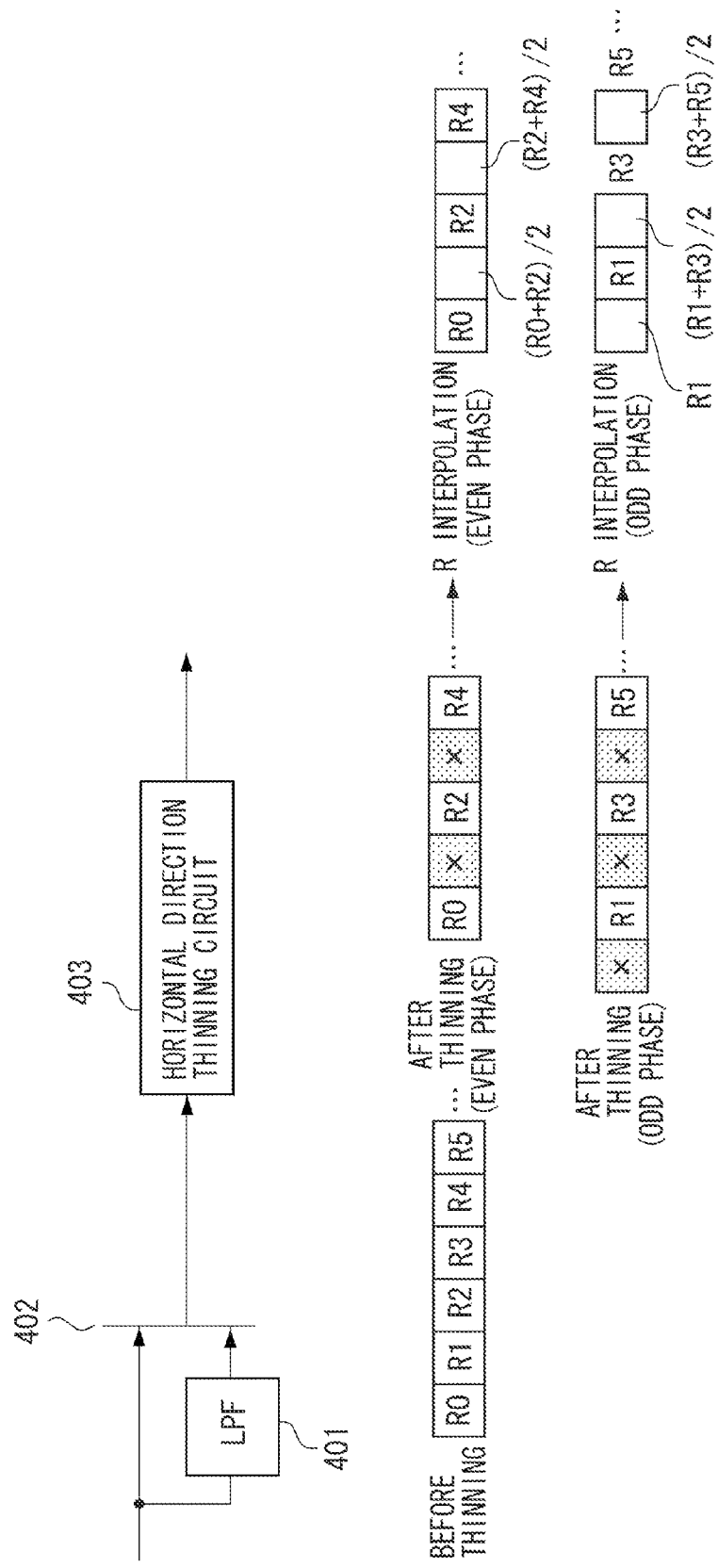
FIG. 4 illustrates a detailed configuration of an R thinning circuit.

RB thinning circuits (i.e., an R thinning circuit+a B thinning circuit) 212 to 214 reduce RB resolutions. FIG. 4 illustrates a detailed configuration of the R thinning circuit. A low-pass filter circuit 401 may be implemented, for example, by a transfer function H (z)=½(1+z$^{-1}$). A selector circuit 402 selects whether to use the low-pass filter circuit 401. The system control circuit 107 selects an even phase or an odd phase as a phase for thinning. A horizontal direction thinning circuit 403 performs thinning processing to the image data of the R components using the selected thinning phase. The B thinning circuit has a configuration similar to the R thinning circuit. As will be described below, the system control circuit 107 selects whether to use the low-pass filter circuit 401 for each frequency band.

As a result, the frequency decomposition circuit 201 outputs image data of Y/RB containing two planes of the Y components and the RB components, which are subjected to band limitation in each frequency band (Y/RB-2 to Y/RB-4), to the image buffer region 220. The image data, which is not subjected to the band limitation, is directly output as the image data (Bayer-1) of the Bayer array.

The frequency synthesis circuit 202 performs correction of chromatic aberration of magnification by circuits 215 to 218 for correcting the chromatic aberration of magnification in each frequency band. With respect to the data of Bayer-1, the circuit 215 for correcting the chromatic aberration of magnification performs R interpolation and B interpolation, and further performs the correction of the chromatic aberration of magnification. With respect to the data pieces of Y/RB-2 to Y/RB-4, as illustrated in FIG. 4, the circuits 216 to 218 for correcting the chromatic aberration of magnification select phases for the interpolation according to the phases for the thinning selected in the RB thinning circuits 212 to 214. More specifically, if the thinning phase is an even phase, an even phase is selected as the interpolation phase, and if the thinning phase is an odd phase, an odd phase is selected as the interpolation phase. With respect to the data pieces of Y/RB-2 to Y/RB-4, the circuits 216 to 218 for correcting the chromatic aberration of magnification perform the correction of the chromatic aberration of magnification of the R components and the B components using the Y components as a reference instead of the G components.

In the R interpolation and the B interpolation, in the present exemplary embodiment, the pixel values for interpolating the R components and the B components are generated using average values of peripheral pixels. However, the pixel values may be generated using other known techniques. For example, a technique for increasing resolutions of the R component and the B component using a high-frequency component of the G component has been known. If this technique is applied by replacing the G component with the Y component, even if the horizontal resolutions of the R component and the B component decrease as a result of the RB thinning, the deterioration in the resolutions may be restored in the correction of the chromatic aberration of magnification. Further, also to the data of Bayer-1, the R interpolation and the B interpolation may be applied by this technique.

For the correction of the chromatic aberration of magnification, a known technique may be applied. For example, in a memory (not shown) for storing correction data, a deviation of an image formation position of the R component to the image formation position of the Y component (or the G component) is stored for each state of the imaging optical system 101 (a zoom position, a focus position, an aperture value, or the like) and an image height. The circuits 215 to 218 for correcting the chromatic aberration of magnification read the deviation amount of the image formation position of the R component in the target pixel corresponding to the state of the imaging optical system 101 at the time the video signal is generated by the image sensor 102 and the image height of the target pixel to be corrected. The circuits 215 to 218 for correcting the chromatic aberration of magnification calculate the value of the R component at the position corresponding to the deviation amount by interpolation using values of R components of peripheral pixels of the position, and determine the obtained value as the value of the R component in the target pixel. The operation is similarly performed in the B component.

A noise reduction circuit 219 generates the Cr component by (R-Y) using inverse conversion by the format conversion circuits 209 to 211. The noise reduction circuit 219 similarly generates the Cb component by (B-Y). The processing of the noise reduction is separately performed to the luminance component and the color difference component. In each pixel and in each Y/Cr/Cb component, the Y/Cr/Cb component of one frequency band is selected from among the Y/Cr/Cb components in the frequency bands to which the noise reduction is performed, according to edge information of the object or the like, and output as an output image.

Figure 5:
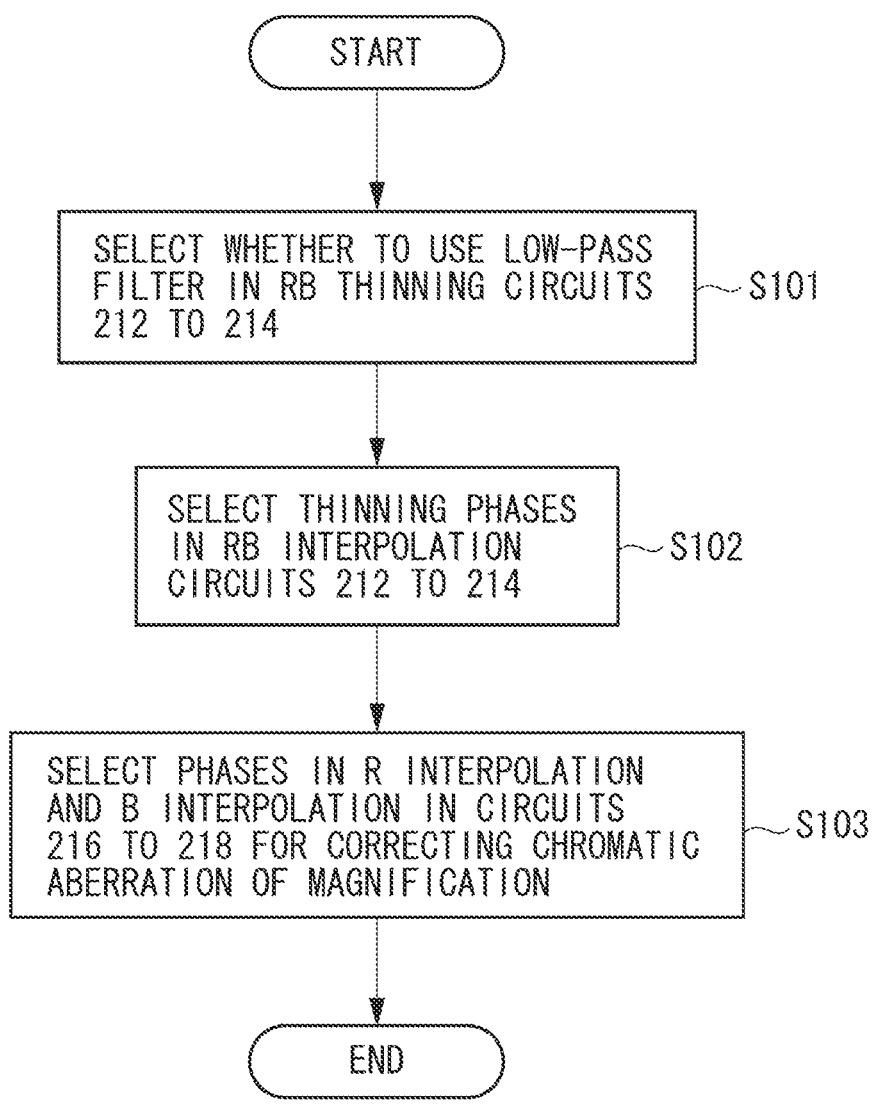
FIG. 5 is a flowchart illustrating selection processing of a thinning method in RB thinning circuits.

FIG. 5 is a flowchart illustrating the selection processing in the thinning method in the RB interpolation circuits 212 to 214. In operation S101, the system control circuit 107 selects whether to use the low-pass filter circuit 401 in the RB thinning circuits 212 to 214. In operation S102, the system control circuit 107 selects individual thinning phases in the RB thinning circuits 212 to 214. In operation S103, the system control circuit 107 selects phases of the R interpolation and the B interpolation in the circuits 216 to 218 for correcting the chromatic aberration of magnification according to the thinning phases selected in operation S102.

As described above, the R component and the B component are necessary to perform the correction of the chromatic aberration of magnification, and the G1 component and the G2 component are necessary to be separately used to perform the false color suppression processing. Therefore, the image processing apparatus according to the present exemplary embodiment first performs the false color suppression processing in which the G1 component and the G2 component need to be separately used, converts the image data of R/G1/G2/B into the image data of Y/R/B, and stores the converted data in the image buffer region 220.

Accordingly, the memory capacity of the image buffer region 220 may be reduced as compared to the case that the image data pieces decomposed into the plurality of frequency bands are used as the image data of R/G1/G2/B. The reason that not the image data of Y/Cr/Cb but the image data of Y/R/B is used as the image data to be stored in the image buffer region 220 is that the correction of chromatic aberration of magnification using the R component and the B component is to be performed in the latter stage.

Further, according to the present exemplary embodiment, by using the RB thinning circuits 212 to 214, the memory capacity necessary in the image buffer region 220 may be further reduced.

A second exemplary embodiment is described. The configuration of an image processing apparatus according to the present exemplary embodiment is similar to that illustrated in FIG. 1. However, in the present exemplary embodiment, a detailed configuration of the signal processing circuit 104 is different from that in the first exemplary embodiment.

Figure 6:
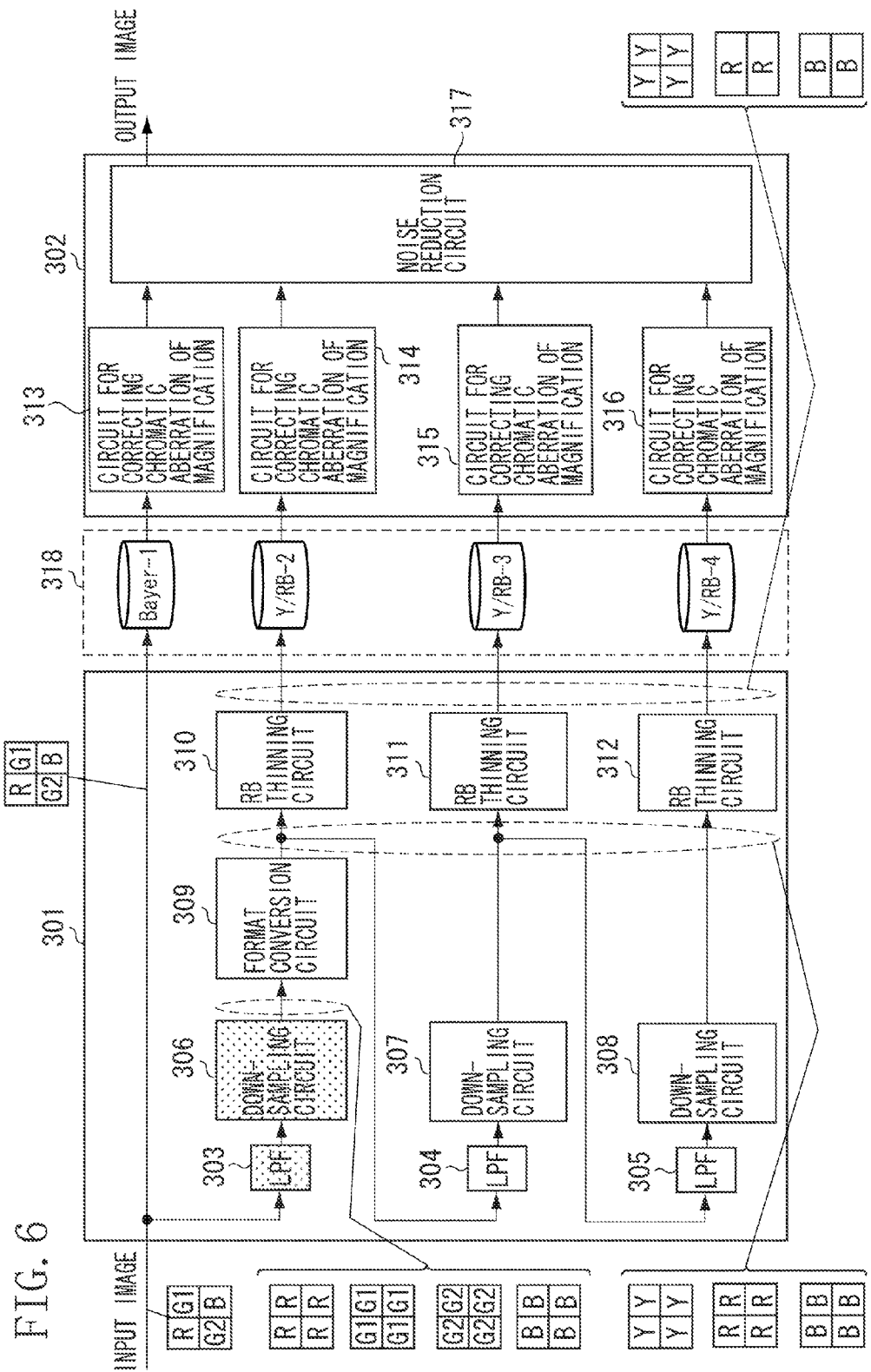
FIG. 6 illustrates a detailed configuration of a signal processing circuit according to a second exemplary embodiment.

FIG. 6 illustrates the detailed configuration of the signal processing circuit 104 according to the second exemplary embodiment. In FIG. 6, a configuration of a frequency synthesis circuit 302 is similar to that of the frequency synthesis circuit 202 in FIG. 3. A configuration of an image buffer region 318 in FIG. 6 is similar to that in the image buffer region 220 in FIG. 3. A configuration of a frequency decomposition circuit 301 in FIG. 6 is partly different from that of the frequency decomposition circuit 201 in FIG. 3.

A configuration of a low-pass filter circuit 303 is similar to those in the low-pass filter circuits 203 to 205 in FIG. 3. A configuration of a down-sampling circuit 306 is similar to those in the down-sampling circuits 206 to 208 in FIG. 3. A format conversion circuit 309 is similar to the format conversion circuits 209 to 211 in FIG. 3. As illustrated in FIG. 3, the three format conversion circuits are necessary in the first exemplary embodiment. However, in the second exemplary embodiment, only one format conversion circuit is necessary as illustrated in FIG. 6, and accordingly, the size of the circuit may be small.

Low-pass filter circuits 304 and 305 are similar to the low-pass filter circuit 303. A format of image data handled in the low-pass filter circuit 303 is four planes of R/G1/G2/B. By comparison, a format of image data handled in the low-pass filter circuits 304 and 305 is three planes of Y/R/B, so that the size of the circuit may be small.

Similarly, down-sampling circuits 307 and 308 are similar to the down-sampling circuit 306. However, the down-sampling circuits 307 and 308 handle three planes, which is different from the down-sampling circuit 306 handling four planes. As a result, the size of the down-sampling circuits 307 and 308 may be small. RB thinning circuits 310 to 312 are similar to the RB thinning circuits 212 to 214 in FIG. 3. In the present exemplary embodiment, the RB thinning circuits 310 to 312 are provided for each frequency band, filtering or a thinning phase of the R component and the B component may be selected for each frequency band as similarly to the case in FIG. 3.

A comparative example of the first and second exemplary embodiments is described. A configuration of an image processing apparatus according to the comparative example is similar to that illustrated in FIG. 1, however, a detailed configuration of the signal processing circuit 104 is different from that in the first exemplary embodiment.

Figure 7:
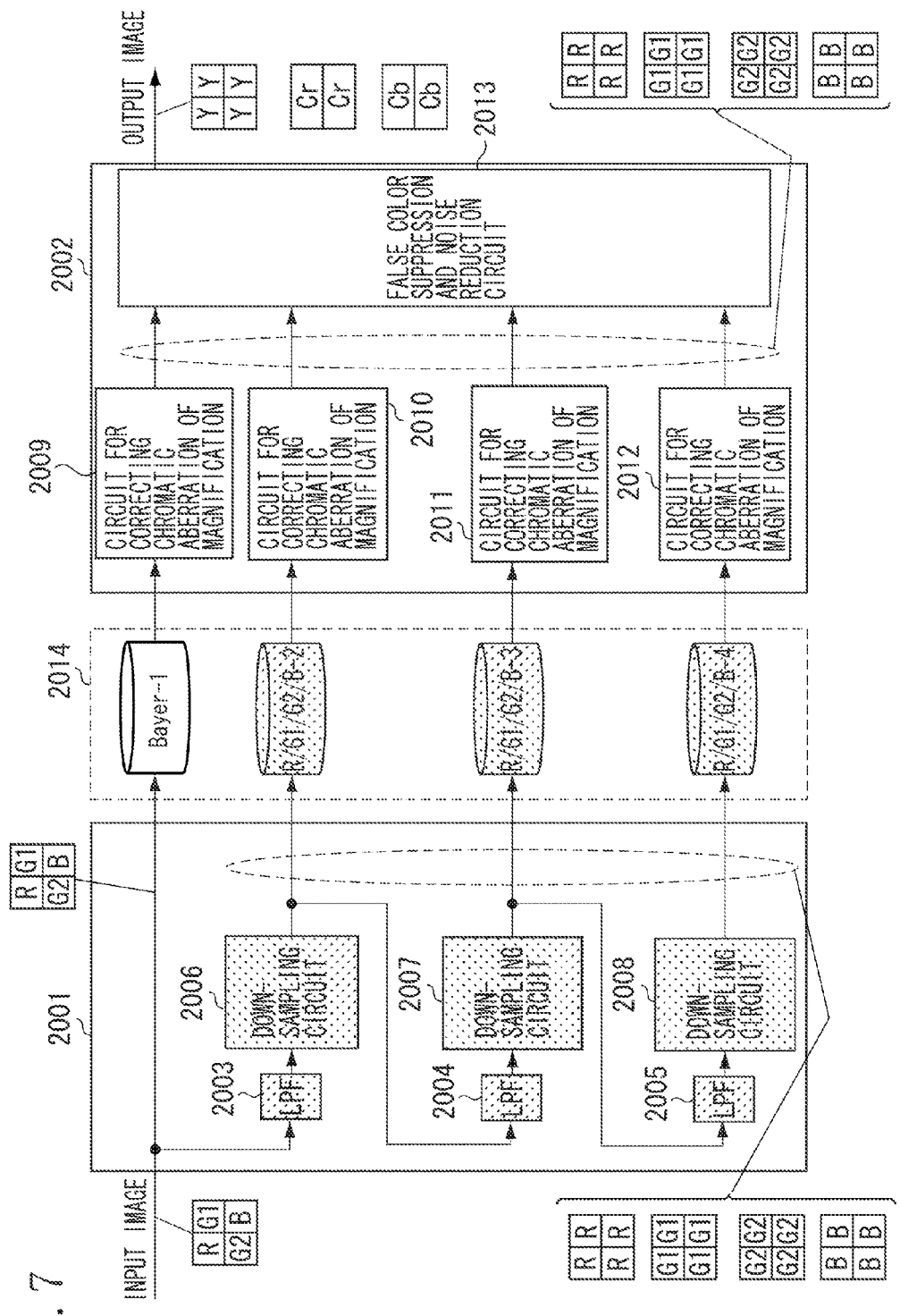
FIG. 7 illustrates a detailed configuration of a signal processing circuit in a comparative example.

FIG. 7 illustrates the detailed configuration of the signal processing circuit 104 in the image forming apparatus according to the comparative example. The signal processing circuit 104 includes a frequency decomposition circuit 2001, a frequency synthesis circuit 2002, and an image buffer region 2014.

Low-pass filter circuits 2003 to 2005 in the frequency decomposition circuit 2001 may be implemented, for example, by the transfer function $H(z)=\frac{1}{2}(1+z^{-1})$ both in the horizontal direction and the vertical direction. Down-sampling circuits 2006 to 2008 may reduce image data in the horizontal direction and the vertical direction. A phase to which down-sampling is performed is a pixel on the left side in two pixels of right and left in the horizontal direction, and a pixel on the upper side in two pixels of the upper side and the lower side in the vertical direction.

The image buffer region 2014 includes a DRAM or the like. The frequency decomposition circuit 2001 receives image data of a Bayer array as input. The frequency decomposition circuit 2001 outputs image data (Bayer-1), which is not subjected to band limitation, and image data (R/G1/G2/B-2 to R/G1/G2/B-4) of red components, green components, and blue components, which are subjected to the band limitation, as a third image data to the image buffer region 2014.

The frequency band of the image data of R/G1/G2/B-2 is limited to half in the horizontal direction and in the vertical direction by the low-pass filter circuit 2003, and the pixel numbers are thinned to half in the horizontal direction and in the vertical direction by the down-sampling circuit 2006. The image data to be input has a Bayer array, and each color filter component of R, G1, G2, and B has a half resolution from the beginning in the horizontal direction and the vertical direction. Accordingly, the image data after the down-sampling processing is stored in each plane of the R component, the G1 component, the G2 component, and the B component.

The frequency band of the image data of R/G1/G2/B-3 is limited to half in the horizontal direction and in the vertical direction by the low-pass filter circuit 2004, and the pixel numbers are thinned to half in the horizontal direction and in the vertical direction by the down-sampling circuit 2007.

The frequency band of the image data of R/G1/G2/B-4 is limited to half in the horizontal direction and in the vertical direction by the low-pass filter circuit 2005, and the pixel numbers are thinned to half in the horizontal direction and in the vertical direction by the down-sampling circuit 2008.

The frequency synthesis circuit 2002 includes circuits 2009 to 2012 for correcting the chromatic aberration of magnification and a false color suppression and noise reduction circuit 2013. The frequency synthesis circuit 2002 performs the correction of chromatic aberration of magnification in each frequency band by the circuits 2009 to 2012 for correcting the chromatic aberration of magnification. On the data of Bayer-1, the circuit 2009 for correcting the chromatic aberration of magnification performs R interpolation and B interpolation, and further performs the correction of the chromatic aberration of magnification. On the data pieces of R/G1/G2/B-2 to R/G1/G2/B-4, the synchronization of the R component and the B component has already been performed, and accordingly, the R interpolation processing and the B interpolation processing are skipped. In the following false color suppression processing, difference information of G1 and G2 components is necessary, and therefore, the G component is output as the G1 component and the G2 component to the false color suppression and noise reduction circuit 2013.

The false color suppression and noise reduction circuit 2013 performs the false color suppression processing of the color difference component. In the processing, a color component is generated in each frequency component. At this step, an edge component is detected in each frequency component, and noise reduction processing is performed. The generated components of each color are synthesized later, and output as color difference signals of a Cr component and a Cb component. The resolutions of the color difference signals of the Cr component and the Cb component in the horizontal direction are reduced to half of the resolutions respectively, and the signals are output as a color difference signal CrCb of one plane. Regarding a luminance component, the noise reduction processing is performed according to a method discussed in Japanese Patent Application Laid-Open No. 2008-015741, and the signal is output as a luminance signal Y of one plane.

In the image processing apparatus according to the comparative example, it is necessary to store the image data, which is subjected to the band limitation, in the four planes of R/G1/G2/B in the image buffer region 2014 including the DRAM, or the like. Further, it is necessary to store the image data pieces of the four planes in each frequency band. Therefore, in a case of processing requiring high-speed performance, such as continuous shooting, if the memory access amount per unit time increases and reaches an upper limit of the memory access band, the processing performance decreases. Further, the increase in the necessary memory capacity will cause increase in the cost of the image processing apparatus.

In comparison with the comparative example, in the first and second exemplary embodiments, the image data of Y/RB comprising the two planes of the Y component and the RB component is output to the image buffer region. Accordingly, the necessary memory capacity may be reduced, and the cost may also be reduced. Further, the memory access amount per unit time may also be reduced, and accordingly, the processing performance may be prevented from deteriorating.

As described above, according to the first and second exemplary embodiments, the correction processing of chromatic aberration of magnification and the noise reduction processing may be performed without decrease in the processing performance and increase in the cost. Especially, according to the second exemplary embodiment, the processing may be implemented by the small-sized circuit.

A third exemplary embodiment is described. The configuration of an image processing apparatus according to the present exemplary embodiment is similar to that illustrated in FIG. 1. However in the present exemplary embodiment, a detailed configuration of the signal processing circuit 104 is different from that in the first exemplary embodiment.

The signal processing circuit 104 in the present exemplary embodiment includes an operation mode of the signal processing circuit 104 in the first or the second exemplary embodiment, and an operation mode of the signal processing circuit 104 in the comparative example. The system control circuit 107 may switch the two operation modes by determining a necessary memory band.

As described above, according to the first or second exemplary embodiment, the correction processing of chromatic aberration of magnification and the noise reduction processing may be performed without decrease in the processing performance and increase in the cost (i.e., a high performance mode). According to the comparative example, since the color component resolution is not reduced in the image buffer region, higher quality image data may be generated (i.e., a high image quality mode).

In the following description, a case where the performance is decreased by limitation of a memory band, for example, a case where still images of about ten million pixels are captured at ten frames per second in a high-speed continuous shooting is used as an example. However, the embodiments are not limited to such case. For example, if high-definition moving image recording and the other processing are simultaneously performed, or an available memory band is limited due to the other factors, the embodiments may be applied to the cases.

Figure 8:
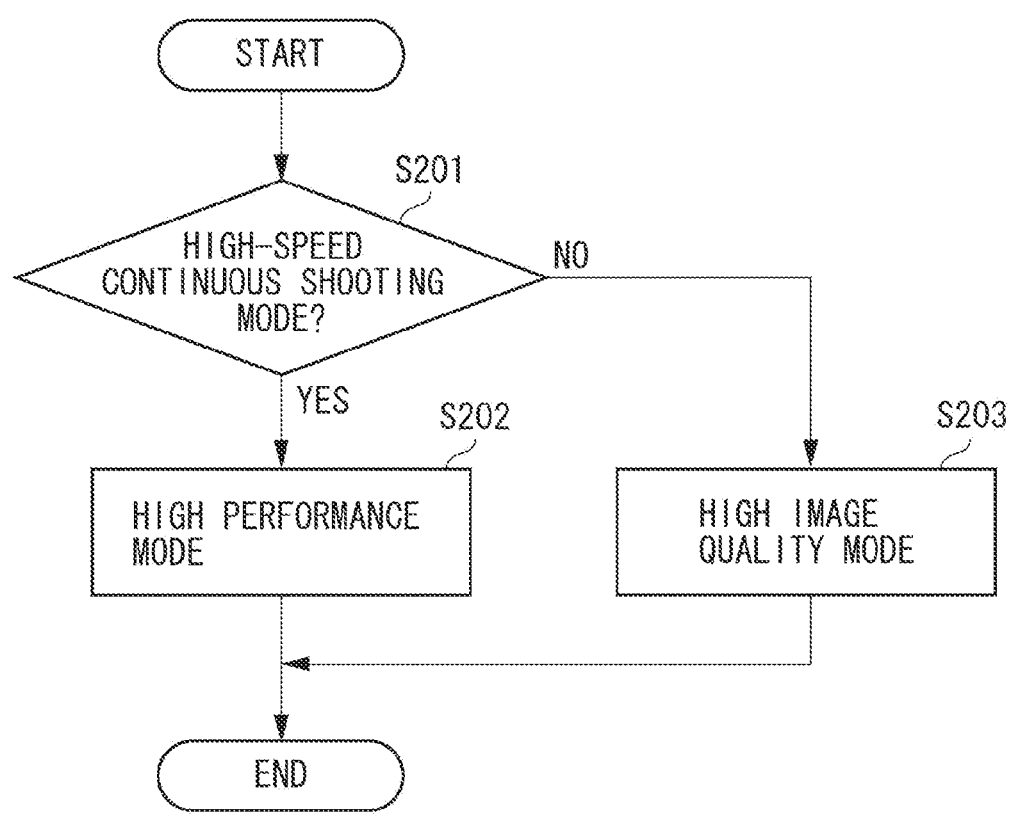
FIG. 8 is a flowchart illustrating processing in a system control circuit according to a third exemplary embodiment.

FIG. 8 is a flowchart illustrating processing in the system control circuit 107 according to the third exemplary embodiment. In operation S201, the system control circuit 107 determines whether the mode is a high-speed continuous shooting mode. If the mode is the high-speed continuous shooting mode (YES in operation S201), then in operation S202, the system control circuit 107 selects the high performance mode and ensures a necessary performance, for example, ten frames per second. On the other hand, if the mode is not the high-speed continuous shooting mode (NO in operation S201), then in operation S203, the system control circuit 107 selects the high image quality mode.

According to the present exemplary embodiment, when the correction processing of the chromatic aberration of magnification and the noise reduction processing are performed, the operation mode may be selected such that the image quality and the performance are to be optimum.

The embodiments may also be realized by executing the following processing. More specifically, software (a program) for realizing the functions of the above described exemplary embodiments is supplied to a system or an apparatus via a network or various storage media and a computer (or a CPU or a micro processing unit (MPU)) of the system or the apparatus reads and executes the program.

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a storage medium, an array of color components). In addition, the operations in the method transform the elements or parts from one state to another state. The transformation is particularized and focused on processing an image. The transformation provides a different function or use such as converting first image data including an array of color components into second image data, storing the second image data in a storage medium, and reading the second image data and performing correction of chromatic aberration of magnification, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the embodiments have been described with reference to exemplary embodiments, it is to be understood that the embodiments are not limited to the disclosed exemplary embodiments. The scope of the following claims is to be accorded the broadest interpretation so as to encompass all modifications, equivalent structures, and functions.

What is claimed is:

1. An image processing apparatus comprising:
    a first conversion unit configured to convert first image data, which includes an array of color components of red, green, and blue, into second image data including the color components of red and blue and a luminance component;
    a down-sampling unit configured to generate third image data by reducing the second image data;
    a noise reduction unit configured to perform noise reduction processing on the second image data and the third image data, and generate output image data from the second image data to which the noise reduction processing is performed and the third image data to which the noise reduction processing is performed.

2. The image processing apparatus according to claim 1, further comprising:
    a thinning unit configured to thin the color components of red and blue in the second image data such that resolution of the color components of red and blue become lower than resolution of the luminance component.

3. The image processing apparatus according to claim 1, further comprising a control unit configured to set first mode or second mode,
    wherein down-sampling unit generates the third image data by reducing the second image data, and the noise reduction unit performs the noise reduction processing on the second image data and the third image data and generates output image data from the second image data to which the noise reduction processing is performed and the third image data to which the noise reduction processing is performed, when the control unit sets the first mode, and
    wherein the down-sampling unit generates fourth image data, which is including an array of color components of red, green, and blue, by reducing the first image data, and the noise reduction unit configured to perform the noise reduction processing on the first image data and fourth image data, and generates output image data from the first image data to which the noise reduction processing is performed and the fourth image data to which the noise reduction processing is performed, when the control unit sets the second mode.

4. The image processing apparatus according to claim 3, wherein the control unit sets the first mode or second mode according to a requested processing speed.

5. A method for processing image, the method comprising:
    converting first image data, which includes an array of color components of red, green, and blue, into second image data including the color components of red and blue and a luminance component;
    generating third image data by reducing the second image data;
    performing noise reduction processing on the second image data and third image data; and
    generating output image data from the second image data to which the noise reduction processing is performed and the third image data to which the noise reduction processing is performed.

* * * * *